US012506297B2

(12) United States Patent
Phillips

(10) Patent No.: US 12,506,297 B2
(45) Date of Patent: Dec. 23, 2025

(54) CONNECTOR AND METHOD OF USE

(71) Applicant: Bruce Phillips, Boca Raton, FL (US)

(72) Inventor: Bruce Phillips, Boca Raton, FL (US)

( * ) Notice: Subject to any disclaimer, the term of this patent is extended or adjusted under 35 U.S.C. 154(b) by 338 days.

(21) Appl. No.: 18/111,739

(22) Filed: Feb. 20, 2023

(65) Prior Publication Data

US 2023/0268688 A1 Aug. 24, 2023

Related U.S. Application Data

(60) Provisional application No. 63/312,197, filed on Feb. 21, 2022.

(51) Int. Cl.

| | |
|---|---|
| ***H01R 13/622*** | (2006.01) |
| ***H01R 13/74*** | (2006.01) |
| ***H01R 43/26*** | (2006.01) |
| ***H01R 105/00*** | (2006.01) |

(52) U.S. Cl.

CPC ......... *H01R 13/622* (2013.01); *H01R 13/746* (2013.01); *H01R 43/26* (2013.01); *H01R 2105/00* (2013.01)

(58) Field of Classification Search

CPC .... H01R 13/622; H01R 13/746; H01R 43/26; H01R 2105/00

USPC ................................ 439/359, 551, 550, 737

See application file for complete search history.

(56) References Cited

U.S. PATENT DOCUMENTS

| | | | | | |
|---|---|---|---|---|---|
| 3,529,278 | A * | 9/1970 | Bishop | H01R 13/22 | 439/786 |
| 3,998,515 | A * | 12/1976 | Panek | H01R 13/746 | 439/589 |
| 4,060,299 | A * | 11/1977 | Williams | H01R 13/746 | 439/551 |
| 5,769,661 | A * | 6/1998 | Nealis | H01R 24/52 | 439/546 |
| 7,063,549 | B1 * | 6/2006 | Chen | H01R 13/622 | 439/277 |
| 7,270,561 | B2 * | 9/2007 | Chiu | F21V 21/03 | 439/551 |
| 7,695,333 | B2 * | 4/2010 | Strickland, Jr. | H01R 24/20 | 439/889 |
| 2002/0076978 | A1 * | 6/2002 | Meyer | H01R 24/52 | 439/551 |
| 2002/0187681 | A1 * | 12/2002 | Brancaleone | H01R 12/523 | 439/638 |
| 2003/0139092 | A1 * | 7/2003 | Wu | F21V 21/02 | 439/551 |
| 2007/0036489 | A1 * | 2/2007 | Grzegorzewska | G02B 6/4292 | 385/86 |
| 2009/0280683 | A1 * | 11/2009 | Zhu | H01R 9/05 | 439/581 |
| 2016/0043509 | A1 * | 2/2016 | Reeves | H01R 13/631 | 439/374 |

* cited by examiner

*Primary Examiner* — Gary F Paumen

(74) *Attorney, Agent, or Firm* — AGK Patent & Trademark Law; Philip Y Kim

(57) ABSTRACT

A cable connector and method includes a female connector and a male connector. The male connector includes a threaded portion insertable through a standard Knock Out (KO) of a panel unit and a nut threaded onto the threaded portion to retain the male connector through the KO. The female connector including a threaded cap engaging the threaded portion to connect the female connector to the male connector.

10 Claims, 6 Drawing Sheets

CONNECTOR AND METHOD OF USE

CROSS-REFERENCE TO RELATED APPLICATIONS

The present application claims the priority of U.S. Provisional Patent Application Ser. No. 63/312,197 filed Feb. 21, 2022, which application is incorporated in its entirety herein by reference.

BACKGROUND OF THE INVENTION

The present invention relates connectors and in particular to a two-part electrical panel connector used to prefabricate electrical wiring.

For decades the electrical construction industry installed electrical wiring in commercial and residential structures with a labor intensive method that required electricians (installers) to cut cable to length and assemble a myriad of boxes, rings, fittings and devices at the job site location. In the 1990's a revolution began in the electrical trade that sought to save time and labor by utilizing prefabrication methods, that is, by preassembling components at a remote location and then delivering them to the job site for final installation. Now, in the 2020's, prefabrication has become the norm rather than the exception. Electrical contractors either prefabricate wiring systems using their own resources, or they purchase some, or all of it, from third-party companies that specialize in the design and manufacture of prefabricated electrical systems.

With the advent of electrical prefabrication, many new products have been developed to help facilitate the process. These products include new brackets, fittings and the like that were not previously available. In fact, the industry has produced mounting brackets that support prefabricated loadcenters and distribution panelboards (panels). Panels are electrical enclosures that contain circuit breakers. Branch circuit cables are attached to the panels and the individual conductors (wires) are then attached to the internal components of the panels including the circuit breakers, neutral bar and ground bar. The opposite end of each cable is routed, typically through framing members (studs), to connect to junction boxes that contain electrical wiring devices such as receptacles, switches and lighting fixtures.

Electrical contractors, and third-party prefabrication companies, have devised methods to prefabricate panels. A typical prefabricated panel used for residential use may include as many as 15 connected cables with the average length of each cable being approximately 25 feet with a few as long, or longer, than 50 feet, and panels used for commercial use may include many more cables. The prefabrication process typically includes terminating all the cable's individual wires to the appropriate circuit breaker, neutral bar and g round bar so that when the "prefabricated panel" is delivered to the construction site (see note, below) all that is left to be done is for it to be lifted and attached to framing members—all internal wiring, save the main panel feed, is complete. Each cable that is attached to the panel is coiled up to conserve space.

The resulting prefabricated panel, with cables attached, is extremely heavy and bulky, often weighing as much as 150 lbs. and taking up a space of approximately 16 square feet. This is the most common complaint voiced by those in the industry: that prefabricated panels are too heavy and too large to package, transport, move about the job site and then lift into framing members for final installation. Moreover, with so many coiled-up cables attached to the exterior of the panel the assembly is very top-heavy.

Prefabrication does not have to be performed off-site. It is common for a contractor to create some form of prefabrication facility at the job-site, e.g. in a trailer elsewhere on site, or in a parking garage level, etc.

Depending on the prefabricated panel's weight, with the attached coiled cables, an installer may first set the panel on the ground, uncoil the cables and stretch them out to lessen the overall weight of the prefabricated panel—it is then lifted into place for securement to the studs.

Once the panel is mounted on studs, the installer then must uncoil each cable (if not previously done so) and "run" the cable to its respective termination point, typically a junction box or lighting fixture. The free end of the cable (not attached to the panel) may need to be pushed up through holes made in framing members at the top of the wall (directly above the panel), routed through other studs or ceiling space and then to its final termination point. If the cable is long then the installer must push/pull the cable through each hole on its way towards its final designated termination point. The installation is made more difficult by the fact that the cable can be pulled only from one direction (as the other end is attached to the panel). If the cable was not attached to the panel, and the cable was very long, then the installer may start at the mid-point of installation and pull in two directions, both towards the final termination point and also towards the panel, saving time and therefore money.

So while prefabricating panels does save time and money (because cables are precut to length and terminated in the panels) they do offer many difficulties related to weight, space, material handling and installation of cable.

BRIEF SUMMARY OF THE INVENTION

The present invention addresses the above and other needs by providing a two part cable connector and method for connecting cables through an electrical panel wall. The two part cable connector includes a male electrical panel connector attached to the electrical panel through the panel wall and includes conductors of varying gauges, colors and lengths. The two part cable connector further includes a female connector attached to an external electrical cable, most commonly MC-Cable, BX-Cable or Non-Metallic Sheathed Cable (NMC), and mating electrically and mechanically to the male connector.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
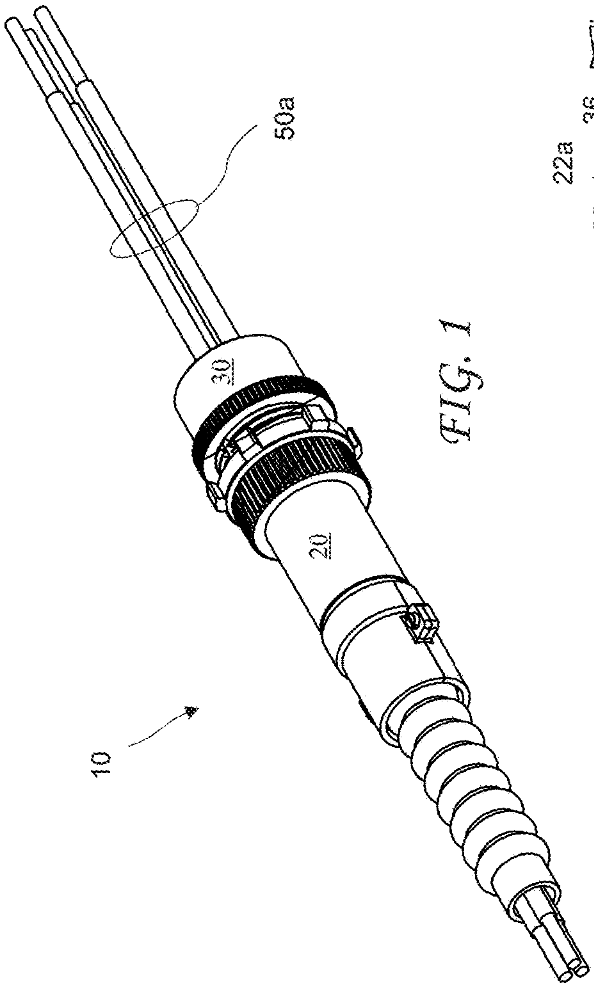
FIG. 1 is a perspective view of a cable connector according to the present invention.
Figure 2:
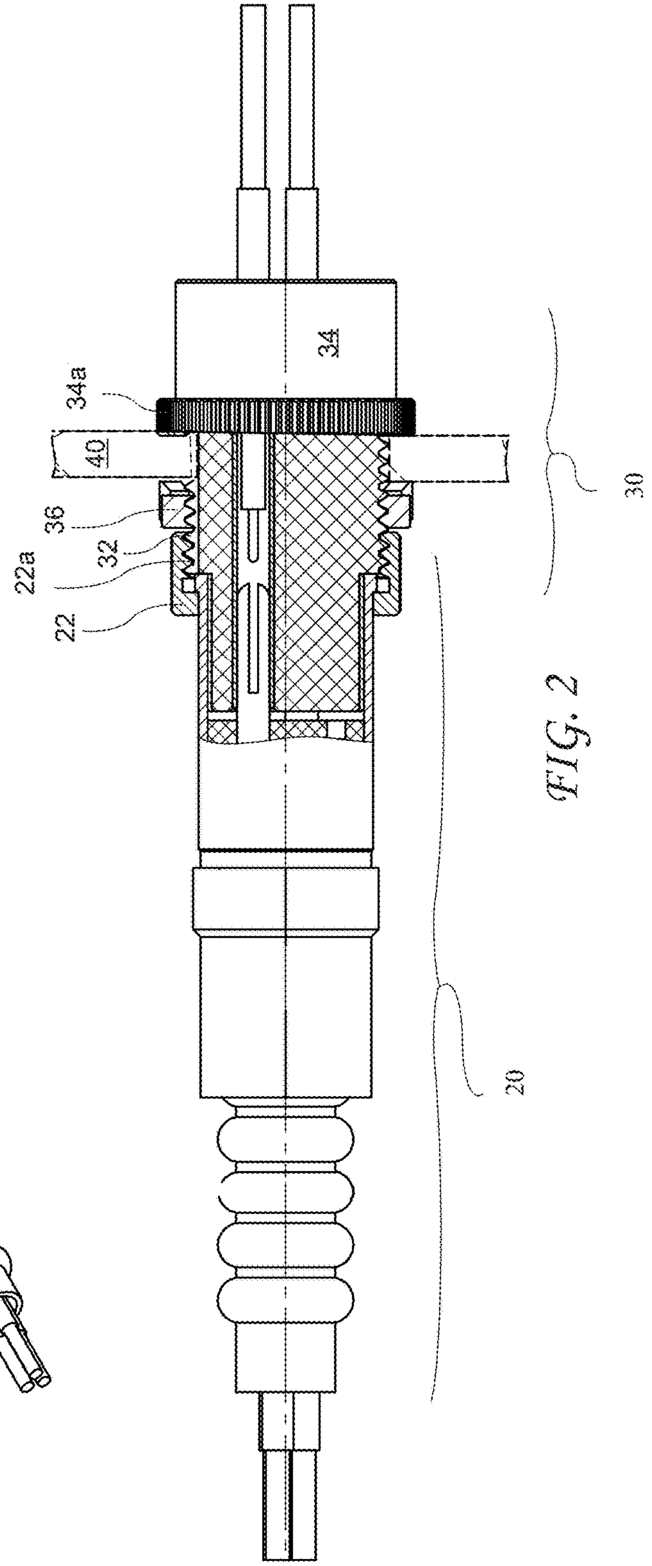
FIG. 2 is a side view of the cable connector according to the present invention.

FIG. 1 shows a perspective view of a cable connector 10 according to the present invention and FIG. 2 is a side view of the cable connector 10. The cable connector 10 includes a female connector 20 including male pins 24 (see FIG. 6A) and male connector 30 including female pins 38 (see FIG. 5A). Female threads 22*a* of a threaded cap 22 of the female connector 20 engages male threads 32 of the male connector 30 to mechanically connect the female connector 20 to the male connector 30. A nut 36 engages the male threads 32 sandwiching an electrical panel wall 40 between the nut 36 and a shoulder 34*a* of a cap 34 of the male connector 30. A nut 36 is a preferred fastener, but press-on washer, for example a starlock washer, toothed retainer washers or the like, may directly hold a smooth nose to hold the female connector 20 in the wall 40.

Figure 3:
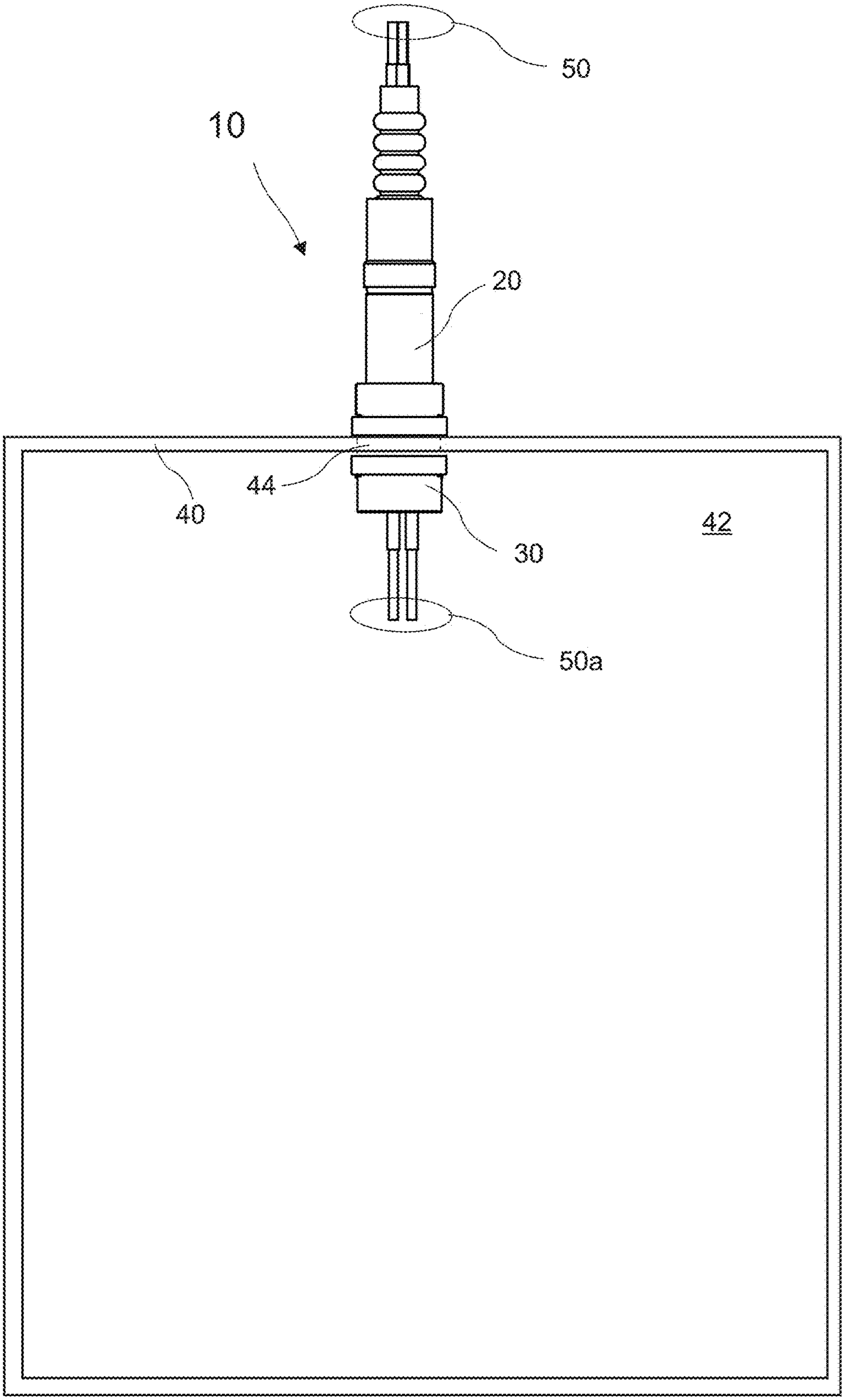
FIG. 3 shows the connector installed through a knock out of a panel unit according to the present invention.

The cable connector 10 is shown installed in the wall 40 of an electrical panel 42 in FIG. 3. The electrical panel 42 may be, for example, an electrical enclosure, a panelboard, a loadcenter, a distribution panel, a junction box, a trough, or the like. The cable connector 10 enters the electrical panel 42 through a standard Knock Out (KO) 44 in the electrical panel wall 40.

Figure 5A:
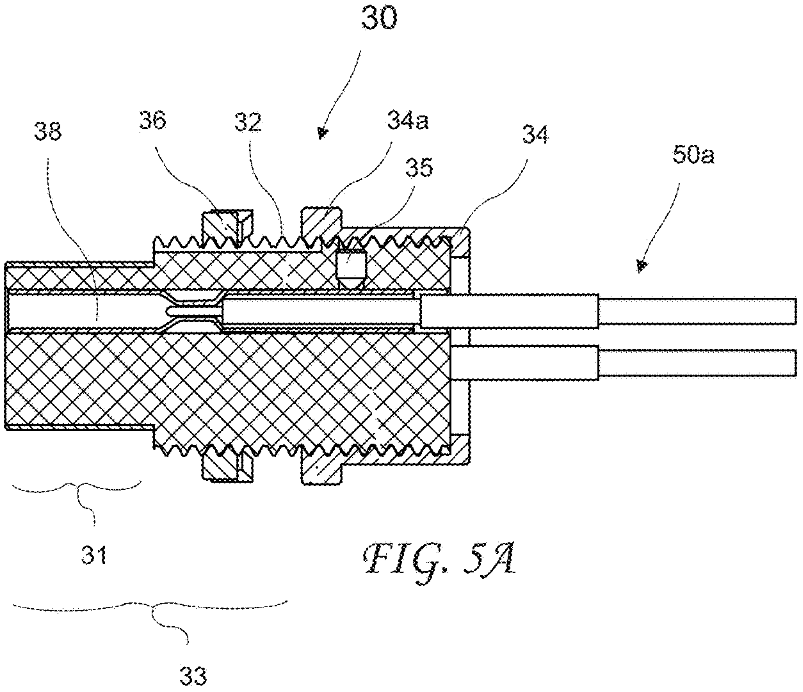
FIG. 5A shows a cross-sectional view of the male connector of the connector according to the present invention.
Figure 5B:
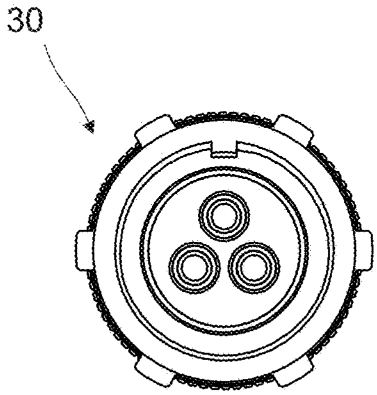
FIG. 5B shows an end view of the male connector of the connector according to the present invention.
Figure 4:
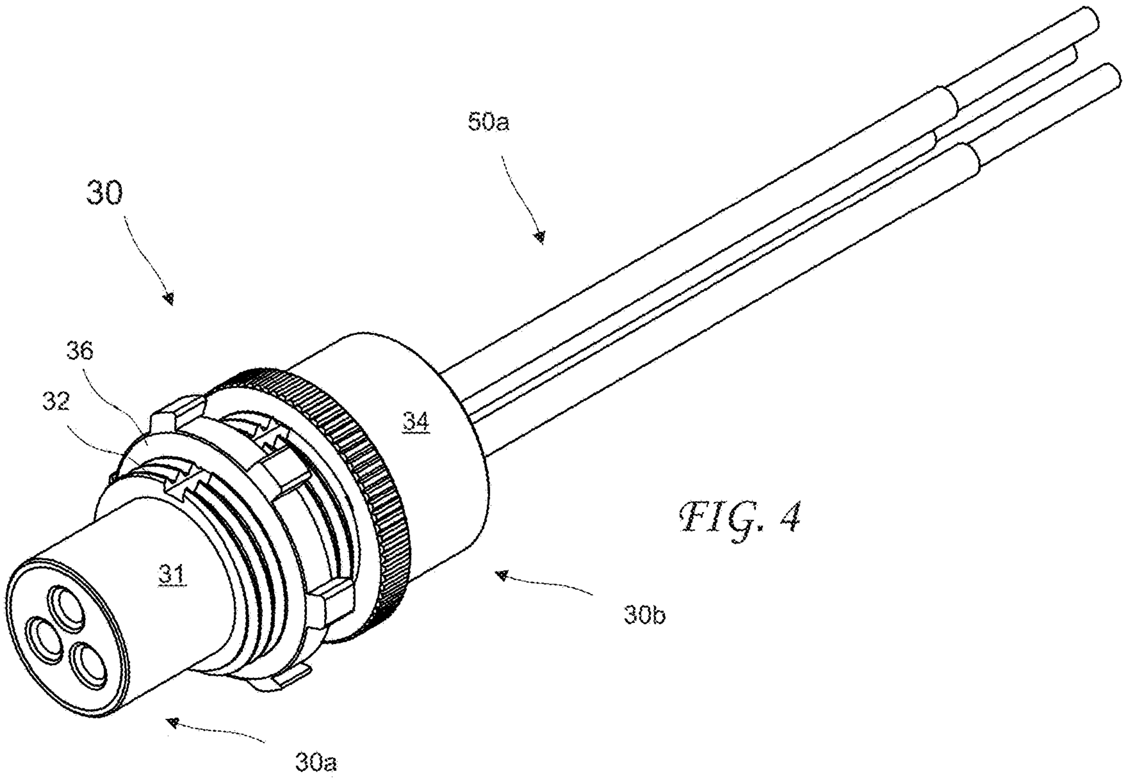
FIG. 4 shows a perspective view of a male connector of the connector according to the present invention.

FIG. 4 shows a perspective view of a male connector 30 of the connector 10, FIG. 5A shows a cross-sectional view of the male connector 30, and FIG. 5B shows an end view of the male connector 30. The male connector 30 has a nose 31 at a nose end 30*a* reaching forward from the male threads 32. The male threads 32 have a diameter sized to slide through and be secured in the KO 44, trade KO diameters are regulated by UL-standards. The male threads 32 are pushed through the KO 44 (see FIG. 3) from the inside of the electrical panel 42 until the shoulder 34*a* on the cap 34 rests against the wall 40 preventing the male connector 30 from pushing further through the KO 44. The cap 34 preferably engages the threads 32, but may be attached to the male connector 30 in any manner, for example, glue, friction fit, crimp, and the like. The installer may then attach the nut 36 on the m ale threads 32, on the outside of the panel wall 40, and tighten the nut 36 against the panel wall 40 to secure the male connector 30 to the panel wall 40. Fastening the nut 36 may also ensure electrical continuity between the male connector 30 and panel 42 for electrical grounding purposes.

Multiple insulated conductors (wires) 50*a* reaching out from an interior end 30*b* are attached to female pins 38 in the nose 31 of the male connector 30, for example by a set screw, crimping or soldering, and the set screws 35 may be used to fix the conductors 50*a* to the female pins 38 while the pins 38 are in the male connector 30. The conductors 50*a* may be identified with industry designations for voltage or as designated by a customer. Identification may be a color, stripe, external label, printed on conductor insulation or other means. Said conductors 50*a* are of adequate length to connect to the internal components in the electrical panel 42, for example, circuit breakers, neutral bar, ground bar, or any other electrical component. The conductors 50*a* may be of various sizes (type and wire gauge) accordingly to meet Code requirements, or the requirements of an authority having jurisdiction (inspector) or as specified by an engineer.

Future versions of the male connector 30 may develop to allow for the attachment of the male connector 30 to the electrical panel 42, through a KO, without the use of the nut 36, for example a snap-in version may be developed to allow the nose 31 to be pushed through the KO and be held in place by interference fit or some other mechanical means, and male connectors having any means for attaching to a panel are intended to come within the scope of the present invention. The connector 10 is described as having three electrical connections or pin pairs, but any connector having any number of connectors or pins, and the features described here, is intended to come within the scope of the present invention. The male and female pins in the connectors 20 and 30 may also be reversed.

Figure 6A:
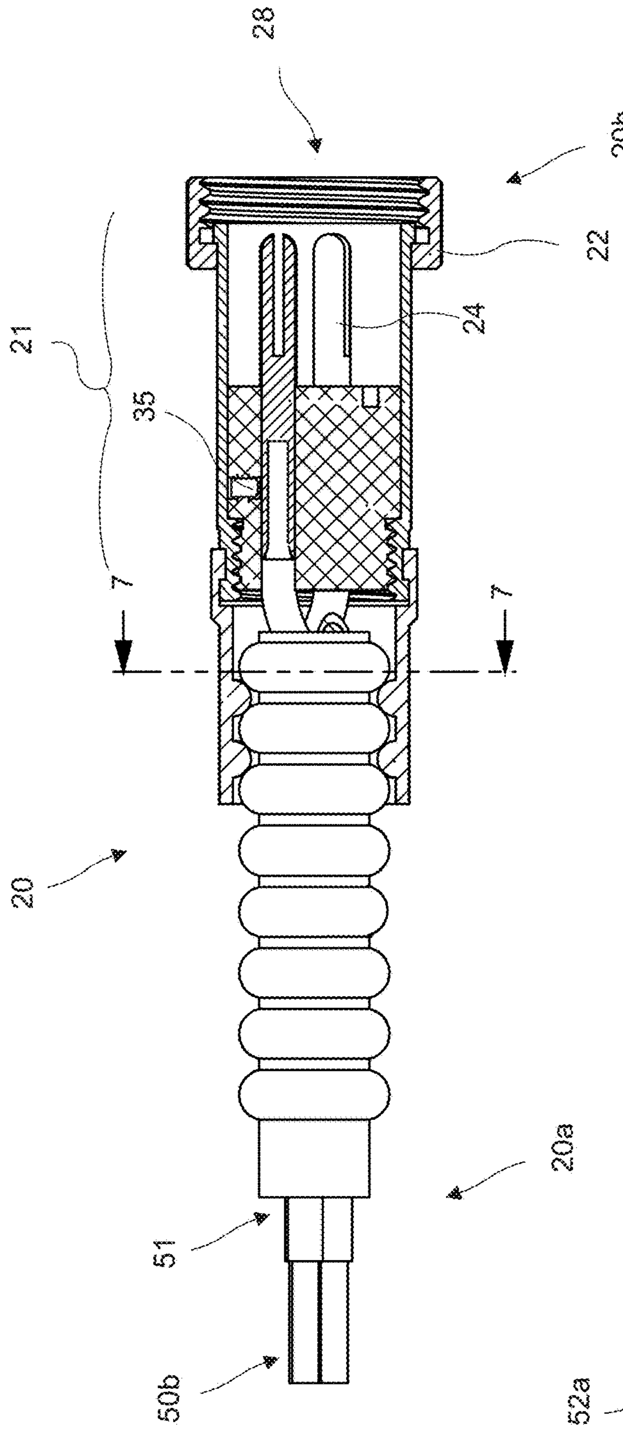
FIG. 6A shows a cross-sectional view of a female connector of the connector according to the present invention.
Figure 7:
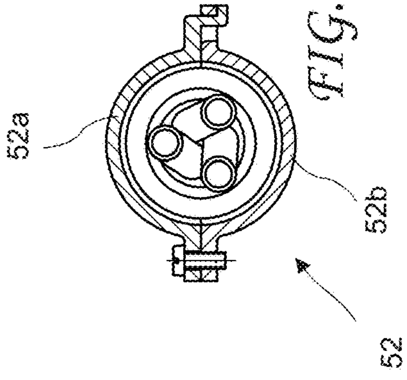
FIG. 7 shows a cross-sectional view of the female connector of the connector according to the present invention taken along line 7-7 of FIG. 6A.
Figure 6B:
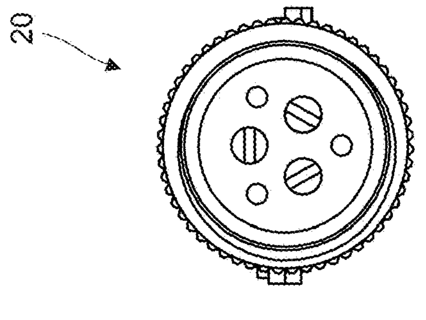
FIG. 6B shows an end view of the female connector of the connector according to the present invention.

FIG. 6A shows a cross-sectional view of a female connector 20 of the connector 10, FIG. 6B shows an end view of the female connector 20, and FIG. 7 shows a cross-sectional view of the female connector 20 taken along line 7-7 of FIG. 6A. The female connector 20 includes male pins 24 in a connecting portion 21, the male pins 24 connected to conductors in insulated wires 50*b* carried in a cable 51 reaching from a cable end 20*a*. The male pins may be attached to the conductors wires 50*b* by a set screw, crimping or soldering. A mouth 28 of the female connector 20 at a mouth end 20*b* slides over the nose 31 of the male connecting 30. The male pins 24 mate with the female pins 38 in the male connector 30, and when connected, complete an electrical connection. A clamping device 52 may be included integral to the female connector 20, when tightened secures the cable 51 to the female connector 20, said securement provides permanent strain relief to ensure outer jacket of cable 51 does not pull out of the female connector 20. The clamping device 52 may provide conductivity to meet grounding requirements to the outer sheath of metallic cable.

The user may remove the outer armor, or plastic jacket, from the cable 51 to be attached to expose individual wires 50*b* contained inside the cable 51. Wires 50*b* are stripped to remove their outer insulation, approximately ⅜ of an inch. Exposed conductors are then be inserted into its designated (identified) pin 24. The user may then tighten the set-screw 35 to secure the conductor in the pin 24 while the pins 24 are in the female connector 20. After all conductors 50*b* are secured in their respective pins 24, the user may use the clamping device 52 to close the outer shell of the female connector 20, hook one side 52*a* to the other side 52*b*, and then fasten the two sides 52*a* and 52*b* tightly together on the outer jacket of the cable 51 with a fastener provided for that purpose. The clamping device may be electrically connected to ground providing grounding continuity.

It is envisioned that future modifications of the design may allow for the exposed conductors to be pushed into the pin and secured with an interference and/or spring mechanical device so that set screws are not needed. It is also possible that the design may include a feature whereby the individual wires 50*a* and 50*b* do not need to have their insulation removed, for example, a process of tightening the set screws to penetrate the insulation to complete the electrical connection may be used.

For metal jacketed cable, the pin designated as "ground" both connect to the ground pin in the male connector 30, to ensure continuity between the panel grounding bar, and also include grounding continuity to the outer shell of the male connector 30. For some applications, the ground pin may not need to maintain electrical conductivity with the outer shell of the connector.

Another version of connector 10 may be fabricated entirely of plastic, with metal components as needed, for use when installed on plastic-jacketed cable, e.g. NMC, or on metal jacketed cable if a design can meet UL Standards and governing Codes.

It is also envisioned that future development may allow for the elimination of the shell secured to the cable with a fastener and instead be designed with a mechanical mechanism that "snaps" closed when squeezed together by the user. In another version, the cable would simply be pushed into the connector and be held in place by a mechanical "finger" or strain relief that would prevent the cable from being pulled out without means of mechanical release.

The connector 10 may further use a mechanical or chemical (adhesive or reaction that bonds the mating pins) means whereby once the female connector 20 and male connector 30 are joined the connection is made permanent and cannot be removed; this feature would be applicable should governing Codes or Listing requirements require it as a result of the connections not being readily accessible once drywall or other substrate covers the female connector 20. By making the connection(s) permanent then accessibility would not be required.

Figure 8:
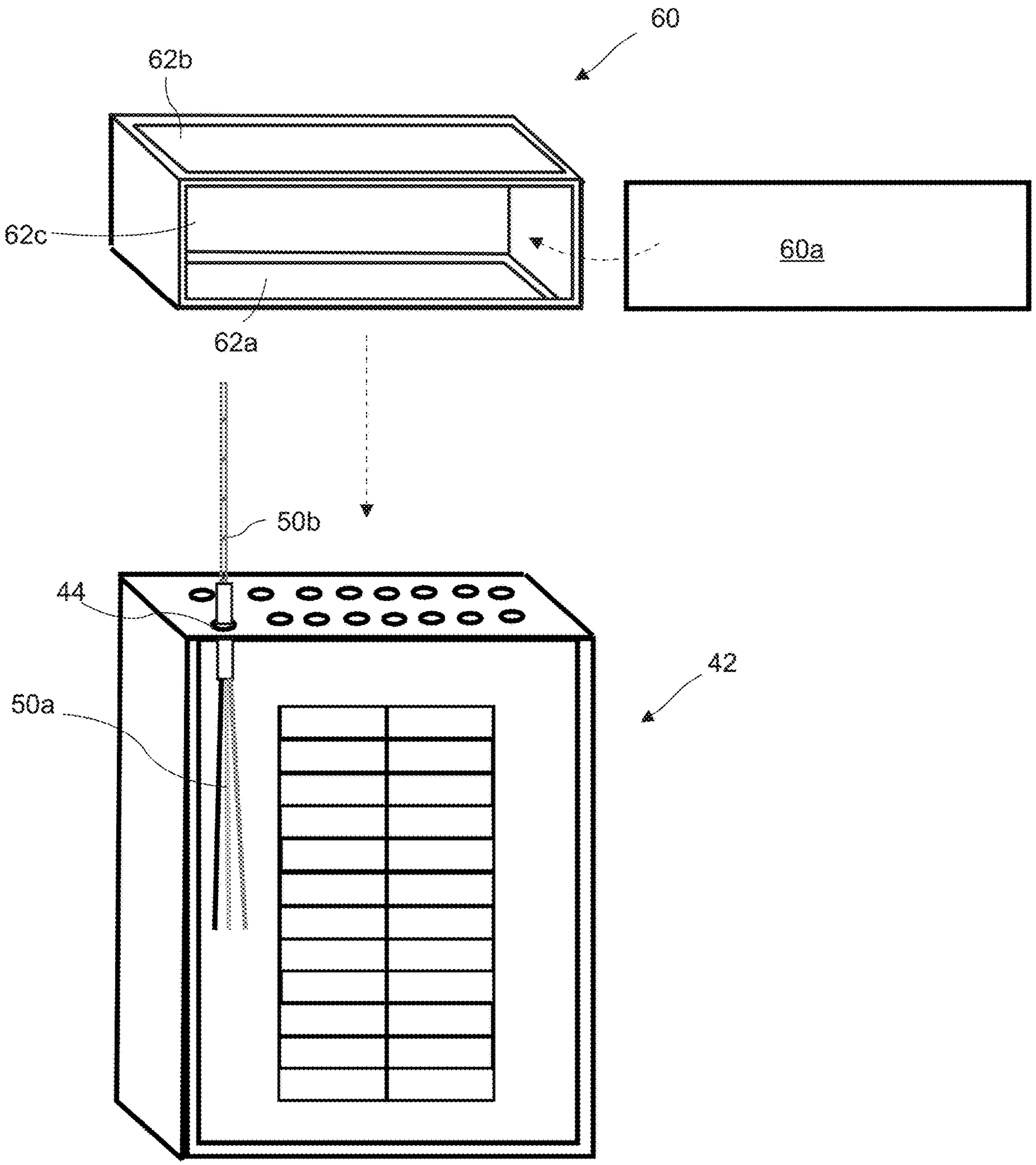
FIG. 8 shows a panel and attachable access box, an access box, according to the present invention.

Another option to meet accessibility requirements, if applicable, is for the installer to first add on an access box 60 having a bottom opening 62*a*, top opening 62*b*, front opening 62*c* shown in FIG. 8. The access box 60 is attached to the panel 42. After attaching the access box 60 to the panel 42, the female connector 20 with cable 50*b* attached is passed through the openings 62*a* and 62*b*. Then female connector 20 is inserted through one of the KOs 44 in the panel 42. Drywall or other substrate, that is installed, is cut to allow access to the front opening 60*c* of the access box 60. Then the installer attaches a removable front opening 60*a* over the front opening 62*c* which allows future access. Those skilled in the art will recognize that the order of assembly may be varied and a method first inserting the connector 20 through the access box 60 and then attaching the access box to the panel is intended to come within the scope of the present invention.

Figure 9:
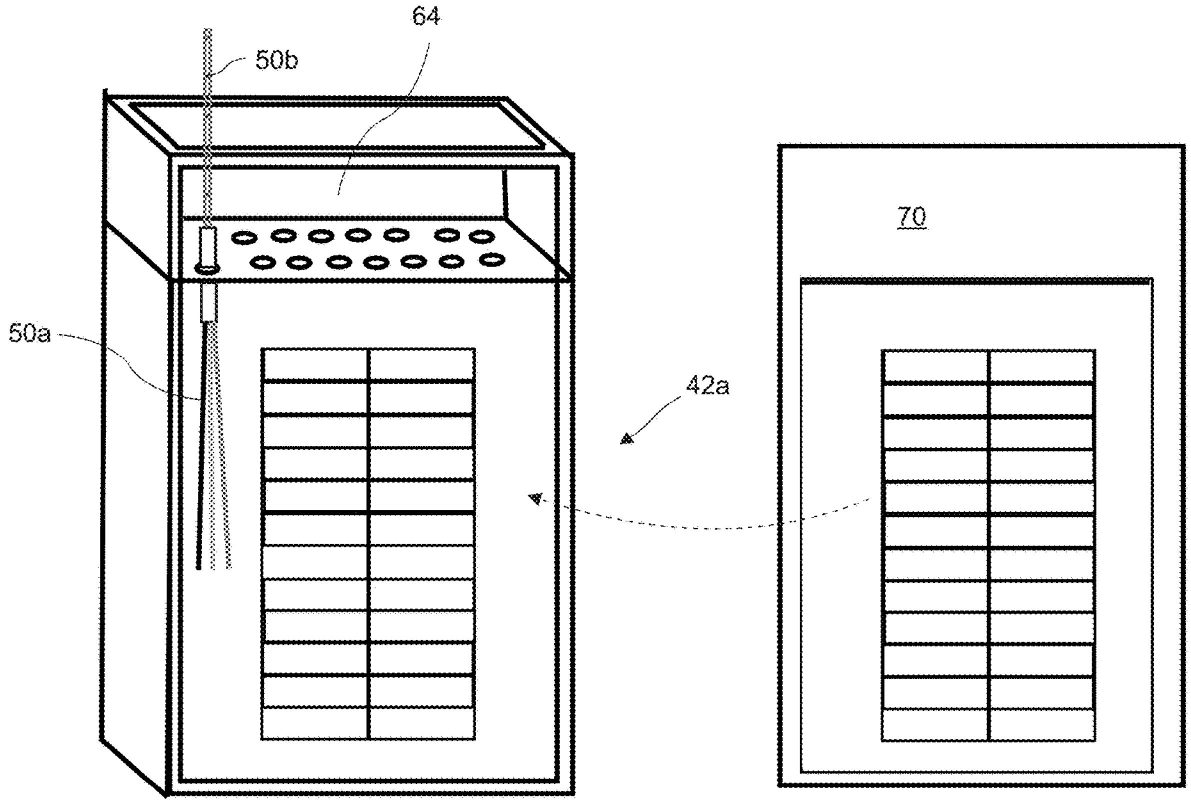
FIG. 9 shows a second panel including an access area, according to the present invention.

Manufacturers of panels 42 may adopt a revised design of a panel 42*a* shown in FIG. 9. An access area 64 can be incorporated at the top (or bottom or side if desired) to allow access to the connectors 10. A front electrical panel cover 70 that customarily comes included with the panels from the factory, may be designed in a manner that will also cover access to the connectors 10.

Duplex Model:

The quantity of KO's in panels are limited in terms of quantity and often the number of cables needed to feed circuits in a structure exceed the number of KO's in a panel. As such, it is common practice to connect cable with a "duplex connector." These connectors, manufactured by all companies engaged in the sale of cable connectors, allow at least two (2) cable to be connected to one (1) KO in a panel.

It is the inventor's intention to develop a "duplex" type connector similarly described, above, to allow two (2) cables to be connected to one (1) KO.

Other Considerations/Uses

1. While this invention has been principally developed for use with "branch" circuits (#14 AWG through #6 AWG), this same concept could be used for feeder cable. Panel feeds could be connected internally in a panel (using male connector 30), to circuit breakers or lugs (in the event the panel does not have a circuit breaker, and is known as "main lug only" type). Feeder cables could then be terminated on a connector similar in design to the female connector 20. This system would be very helpful as so-called homerun cables are very heavy and difficult to handle at the project site. All work attaching components, pulling off cable, etc. could be achieved in a remote location. In fact, for feeder cable, female connector(s) 20 may be attached to both ends of the cable, and Male connector 30 may be pre-installed in the panel or switchgear feeding a panel, and at the panel being fed.

2. The present invention has been originally considered for use with a prefabricated branch wiring system with components being installed at a prefabrication facility and with final connection at the job site. However, inventor envisions that panel manufacturers, e.g. Square D, Eaton, etc. may offer this product pre-installed in their factory panels. Male connector 30 could be pre-installed, with all internal connections complete, and packaging could include a certain quantity of Female connector 20's that the end-use could then connect to cable at the job site. This option would save the installer time because they would not need to internally wire the panel. This may apply to both branch and feeder cables entering panels.

3. The use of the connectors 10 is primarily for use in panels 42. However, it may also be used in other applications. For instance, often panels are installed in "electric rooms" that have no ceiling. Engineers and building owners prohibit the use of MC or NMC to be installed from the panels in the electric room to the branch circuits they feed because 1) cables are subject to physical damage, 2) they are not often supported properly, 3) the installation is unsightly and doesn't look professional or neat, 4) they simply do not like it. As a result, contractors typically install rigid-type conduit, e.g. GRC or EMT from the panels located in the electric room to a point that is above an adjacent ceiling that is finished but accessible (above acoustical tile, for instance); a junction box, trough, or other electrical enclosure (all referred here as "electrical enclosure") may be attached to the conduit. Then wire may be pulled from the electrical enclosure (located above the accessible ceiling) to the electrical panel (that typically houses circuit breakers) through the conduit. The electrical enclosure may be prefabricated with multiple male connector(s) 30 installed. The wires in the electrical enclosure (installed in the conduit connecting the electrical panel to the enclosure) may be connected to male connector 30 with wirenuts, push-in wire connectors, or with a terminal block of some kind installed in the junction box. The female connector 20 may be attached to prefabricated branch cables and subsequently connected to the junction box at time of final installation with the free end being routed to the electrical device it is designed to feed.

Another potential application is for use in commercial/industrial applications where the use of prefabricated branch cabling would offer both labor/cost savings as well as flexibility. For example, an electrical enclosure may be prefabricated with multiple male connectors 30 and delivered to the project site. The installer may then mount said electrical enclosure as required and connect it to a distribution panel using conduit or multi-conductor MC Cable, or the like. Conductors installed in the conduit or cable may then be connected to male connector(s) 30 in the enclosure, and the opposing ends connected in the distribution panel. Then prefabricated cables, fitting at their end with female connector(s) 20 may be field installed to connect to male connector(s) 30 mounted on the enclosure. It is common in commercial/industrial applications that equipment connected to distribution panels be subject to relocation and/or other changes—this system described here would quickly, and safely, allow this function without having to enter a "live" (electrified) distribution panel or related enclosures, e.g. Female connector 20 would just be detached and a replacement/new cable attached without disturbing other circuits.

Moreover, a "system" could be factory assembled that includes a pre-wired enclosure (complete with multiple Male connector 30's) and a multi-conductor cable attached to the enclosure with conductors terminated at male connector(s) 30; the length of the cable could be predetermined for "stock" use, e.g. 25', 50', etc. or as specified by an end-user. The contractor may then terminate the conductors on the free end of the cable (opposite the prefabricated junction box assembly) into distribution panels and terminated on circuit breakers, etc. Female connector(s) 20 may be field installed to connect to male connector(s) 30 mounted on the electrical panel 10. It is common in commercial/industrial applications that equipment connected to distribution panels be subject to relocation and/or other changes—this system described here would quickly, and safely, allow this function without having to enter a "live" (electrified) distribution panel or related junction boxes, e.g. Female connector(s) 20 would just be detached and a replacement/new cable attached without disturbing other circuits.

While the invention herein disclosed has been described by means of specific embodiments and applications thereof, numerous modifications and variations could be made thereto by those skilled in the art without departing from the scope of the invention set forth in the claims.

I claim:

1. A cable connector comprising:
a male connector comprising:
a nose on a nose end of the male connector configured to engage a mouth on a mouth end of a female connector;
first electrical pins reaching into the nose;
first electrical wires electrically connected to the first electrical pins and extending out an interior end opposite to the nose end of the male connector;
a male treaded portion behind the nose;
a cap threadedly engaging the male threaded portion, the cap including a shoulder;
a nut engaging the male threaded portion; and
the nose insertable through a knock out of an electrical enclosure and the shoulder and the nut larger than a knock out diameter; and
the female connector comprising:
the mouth at the mouth end of the female connector configured to engage the nose of the male connector;
second electrical pins residing inside the mouth, the second electrical pins configured to electrically engage the first electrical pins in the male connector;
a cable end of the female connector opposite to the mouth end;
second electrical wires electrically connected to the second electrical pins and extending out the cable end of the female connector; and
an attaching cap residing around the mouth and reaching past the mouth and restrained from sliding past the mouth, the attaching cap configured to engage the male connector.

2. The cable connector of claim 1, wherein the first electrical pins reach into the nose to an outer end of the nose.

3. The cable connector of claim 1, wherein the first electrical pins are female pins and the second electrical pins are male pins.

4. The cable connector of claim 1, wherein set screws threadedly engage the male connector and the female connector and press against the first and second electrical pins to retain the pins in the male connector and the female connector.

5. The cable connector of claim 1, wherein a clamping device secures the cable to the female connector.

6. The cable connector of claim 5, wherein the clamping device is electrically connected to ground providing grounding continuity.

7. The cable connector of claim 1, further including an access box having openings in a top, a bottom and a front, the access box attached to the electrical enclosure, one of the openings overlapping the knock out of the electrical enclosure allowing connection of the female connector to the male connector inside the access box.

8. The cable connector of claim 1, wherein:
the electrical enclosure includes an access area on a top, bottom, or side of the electrical enclosure;
the access area having an open side opposite to an interior of the electrical enclosure; and
an open front of the access area allowing connection of the female connector to the male connector inside the access box.

9. A cable connector comprising:
a male connector comprising:
a nose on a nose end of the male connector configured to engage a mouth on a mouth end of a female connector;
female electrical pins reaching into the nose to an outer end of the nose;
first electrical wires electrically connected to the female pins and extending out an interior end opposite to the nose end of the male connector;
a male threaded portion behind the nose;
a cap threadedly engaging the male threaded portion, the cap including a shoulder;
a nut threadable onto the male threaded portion; and
the male threaded portion insertable through a knock out of an electrical enclosure, and the nut and the shoulder larger than a knock out diameter; and
the female connector comprising:
the mouth at the mouth end of the female connector configured to engage the nose of the male connector;

male electrical pins residing inside the mouth, the male electrical pins configured to align with an electrically engage the female electrical pins in the male connector;

a cable end of the female connector opposite to the mouth end;

second electrical wires electrically connected to the male pins and extending out the cable end of the female connector; and a female threaded cap residing around the mouth and reaching past the mouth and restrained from sliding past the mouth, the female threaded cap configured to engage the male threaded portion of the male connector.

10. A method for wiring an electrical enclosure connector, the method comprising:

inserting female pins into a male connector, at lease part of the female pins residing in a nose of the male connector;

electrically connecting first electrical wires the female electrical pins;

threading a cap having a shoulder onto a male threaded portion of the male connector;

inserting the nose and the male threaded portion of the male connector through a knock out in a wall of an electrical enclosure;

threading a nut onto the male threaded portion sandwiching a wall of the electrical connector between the nut and the shoulder of the the cap, the sandwiching securing the male connector in place through the wall of the electrical panel;

inserting the male pins into a female connector, the male pins reaching into a mouth of the male connector;

electrically attaching second electrical wires of a cable to the male pins;

advancing the mouth of the female connector onto the nose of the male connector and electrically engaging the male pins with corresponding one of the female pins; and threading a female threaded cap of the female connector onto the male threaded portion of the male connector, the female threaded cap residing around the mouth and reaching past the mouth and restrained from sliding past the mouth.

* * * * *